United States Patent
Rhodes et al.

(10) Patent No.: US 8,150,886 B2
(45) Date of Patent: Apr. 3, 2012

(54) MULTIPLE DATABASE ENTITY MODEL GENERATION USING ENTITY MODELS

(75) Inventors: James Bradley Rhodes, Kirkland, WA (US); Jeffery Eric Reed, Lake Stevens, WA (US); Christopher Robinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 11/846,716

(22) Filed: Aug. 29, 2007

(65) Prior Publication Data

US 2009/0063559 A1 Mar. 5, 2009

(51) Int. Cl.
*G06F 17/30* (2006.01)
(52) U.S. Cl. ........................ 707/802; 707/600
(58) Field of Classification Search .................. None
See application file for complete search history.

(56) References Cited

U.S. PATENT DOCUMENTS

| | | | |
|---|---|---|---|
| 5,608,907 A | 3/1997 | Fehskens et al. | |
| 5,713,014 A | 1/1998 | Durflinger et al. | |
| 5,809,505 A | 9/1998 | Lo et al. | |
| 6,122,641 A | 9/2000 | Williamson et al. | |
| 6,163,781 A | 12/2000 | Wess, Jr. et al. | |
| 6,175,837 B1 | 1/2001 | Sharma et al. | |
| 6,360,223 B1 | 3/2002 | Ng et al. | |
| 6,442,557 B1 | 8/2002 | Buteau et al. | |
| 6,591,272 B1 * | 7/2003 | Williams | 707/102 |
| 6,603,857 B1 | 8/2003 | Batten-Carew et al. | |
| 6,643,633 B2 | 11/2003 | Chau et al. | |
| 6,678,462 B1 | 1/2004 | Chihara | |
| 6,718,320 B1 | 4/2004 | Subramanian et al. | |
| 6,868,292 B2 | 3/2005 | Ficco et al. | |
| 6,901,408 B2 | 5/2005 | Fachat et al. | |
| 6,912,565 B1 | 6/2005 | Powers et al. | |
| 7,174,327 B2 | 2/2007 | Chau et al. | |
| 7,321,660 B2 | 1/2008 | Mont et al. | |
| 7,461,393 B1 | 12/2008 | Kishitaka et al. | |
| 2002/0059425 A1 * | 5/2002 | Belfiore et al. | 709/226 |
| 2002/0088002 A1 | 7/2002 | Shintani et al. | |
| 2002/0194609 A1 | 12/2002 | Tran | |
| 2003/0018616 A1 | 1/2003 | Wilbanks et al. | |
| 2003/0192054 A1 | 10/2003 | Birks et al. | |
| 2003/0212705 A1 | 11/2003 | Williams et al. | |
| 2004/0139024 A1 | 7/2004 | So | |
| 2004/0205816 A1 | 10/2004 | Barrett | |
| 2005/0050068 A1 | 3/2005 | Vaschillo et al. | |

(Continued)

FOREIGN PATENT DOCUMENTS

KR 1020030008463 1/2003

(Continued)

OTHER PUBLICATIONS

[EFO] The ADO.NET Entity Framework Overview [msdn.microsoft.com/en-us/library/aa697427(VS.80).aspx] pp. 1-20 Jun. 2006.*

(Continued)

*Primary Examiner* — Syed H Hasan

(57) ABSTRACT

The claimed subject matter provides a system and/or method that generates or creates database entity models using entity models. The system can include devices and components that receive database vendor specific store schema descriptions. The vendor specific store schema descriptions can be employed in conjunction with mapping files that characterize a instance of a database to generate a common object model that can be used to provide a common interface comprehensible across multiple vendor or database types.

20 Claims, 8 Drawing Sheets

U.S. PATENT DOCUMENTS

| | | | |
|---|---|---|---|
| 2005/0050578 A1 | 3/2005 | Ryal | |
| 2005/0080766 A1* | 4/2005 | Ghatare | 707/3 |
| 2005/0177848 A1 | 8/2005 | Hyun | |
| 2005/0193414 A1 | 9/2005 | Horvitz et al. | |
| 2005/0198689 A1 | 9/2005 | Marsh | |
| 2006/0101423 A1 | 5/2006 | Aharoni et al. | |
| 2006/0107289 A1 | 5/2006 | DeYonker et al. | |
| 2006/0161522 A1 | 7/2006 | Dettinger et al. | |
| 2006/0184975 A1 | 8/2006 | Casey | |
| 2006/0218163 A1* | 9/2006 | Marcjan et al. | 707/100 |
| 2006/0235836 A1 | 10/2006 | Dettinger et al. | |
| 2007/0038651 A1 | 2/2007 | Bernstein et al. | |
| 2008/0046599 A1 | 2/2008 | Hutson et al. | |

FOREIGN PATENT DOCUMENTS

| | | |
|---|---|---|
| KR | 1020050063404 | 6/2005 |
| KR | 1020070079064 | 8/2007 |
| WO | 9909494 | 2/1999 |

OTHER PUBLICATIONS

[NGEN] Next-Generation Data Access: Making the Conceptual Level Real [http://msdn.microsoft.com/enus/library/aa730866(VS.80).aspx] Jun. 2006.*

[EDM] Entity Data Model. ADO.NET Technical Preview [ http://msdn.microsoft.com/en-us/library/aa697428(VS.80).aspx ], Jun. 2006.*

Blakeley, et al. "The ADO.NET Entity Framework: Making the Conceptual Level Real" (2006) SIGMOD Record vol. 35, No. 4, 8 pages.

Take a Leap Forward with ADO.NET vNext (Part 1) http://www.devx.com/dotnet/Article/32964/1954?pf=true last viewed May 22, 2007, 8 pages.

International Search Report dated Mar. 10, 2009, for PCT Application Serial No. PCT/US2008/073886, 11 pages.

"ADO.NET 3.0 Framework—Entity Model—Entity SQL—LINQ—A Thing of Beauty". http://www.davidhayden.com/blog/dave/archive/2006/07/23/EntityDataModel.aspx. Last viewed May 22, 2007, 5 pages.

OA dated Nov. 5, 2010 for U.S. Appl. No. 11/842,629, 20 pages.

Bernstein, et al., "Interactive Schema Translation with Instance-Level Mappings" (2005) (Proceedings of the VLDB Conference, 4 pages.

"LINQ to Entities vs. LINQ to SQL—What should I use and when?" http://dotnetaddict.dotnetdevelopersjournal.com/adoef_vs_linqsqlh.htm. Last viewed May 21, 2007, 12 pages.

"Entity Mapping in ADO.NET v Next". http://blogs.msdn.com/adonet/archive/2006/09/13/752865.aspx. Last viewed May 21, 2007, 12 pages.

Liu, et al., "Bidirectional Interpretation of XQuery". ACM, Jan. 2007. pp. 21-30.

OA dated Apr. 15, 2011 for U.S. Appl. No. 11/842,629, 21 pages.

OA dated Jul. 8, 2010 for U.S. Appl. No. 11/842,629, 18 pages.

OA dated Sep. 18, 2009 for U.S. Appl. No. 11/842,629, 35 pages.

* cited by examiner

MULTIPLE DATABASE ENTITY MODEL GENERATION USING ENTITY MODELS

BACKGROUND

Developers of data-centric solutions routinely face situations in which data representations used by applications differ substantially from ones used by databases. A traditional reason for this distinction has included impedance mismatches between programming language abstractions and persistent storage; developers want to encapsulate business logic into objects, yet most enterprise data is stored in relational database systems. A further reason for the distinction is to enable data independence. Even if applications and databases start with the same data representation, they can evolve, leading to differing data representations that must be bridged or mapped. Yet a further reason is independence from Data Base Management System (DBMS) vendors: many enterprise applications run in the middle tier and need to support back-end database systems of varying capabilities, which can require different data representations. Thus, in many enterprise systems separation between application models and database models has become a design choice rather than a technical impediment.

The data transformations required to bridge or map applications and databases can be extremely complex. Even relatively simple object-to-relational (O/R) mapping scenarios where a set of objects is partitioned across several relational tables can require transformations that contain outer joins, nested queries, and case statements in order to reassemble objects from tables. Implementing such transformations can be difficult, especially since the data usually needs to be updatable, a common requirement for many enterprise applications. For example, a recent study indicated that coding and configuring object-to-relational (O/R) data access accounts for up to 40% of total project effort.

Since the mid-1990's, client-side data mapping layers have become a popular alternative to hand coding data access logic, funneled by the growth of Internet applications. A core function of such a layer is to provide an updatable view that exposes a data model closely aligned with the application's data model, driven by an explicit mapping. Many commercial products and open source projects have emerged to offer these capabilities. Virtually every enterprise framework provides a client-side persistence layer (e.g., Enterprise Java Bean (EJB) in Java 2 Platform, Enterprise Edition (J2EE)). Most packaged business applications, such as, for instance, Enterprise Resource Planning (ERP) and Customer Relationship Management (CRM) applications incorporate proprietary data access interfaces (e.g., Business Application Programming Interfaces (BAPIs)).

Currently in order to program against an object-relational mapping technology, such as an entity frame work, database customers (e.g., users, database administrators, database application developers, etc.) typically utilize SQL metadata embedded within application programs. Such an approach however forces database application programmers, users, administrators, and the like, to develop applications or code fragments that are database vendor (e.g., Oracle, IBM, Sybase, Microsoft, etc.) and/or database type (e.g., SQL Server, DB2, dBase, . . . ) specific which can be extremely wasteful in terms of expenditure and time.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in accordance with an illustrative aspect provides a system and/or method that generates or creates database entity models using entity models. The system can include devices and components that receive database vendor specific store schema descriptions. The vendor specific store schema descriptions can be employed in conjunction with mapping files that characterize an instance of a database to generate a common object model that can be used to provide a common interface comprehensible across multiple vendor or database types, and that can be used to provide common access to the instance of the database.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
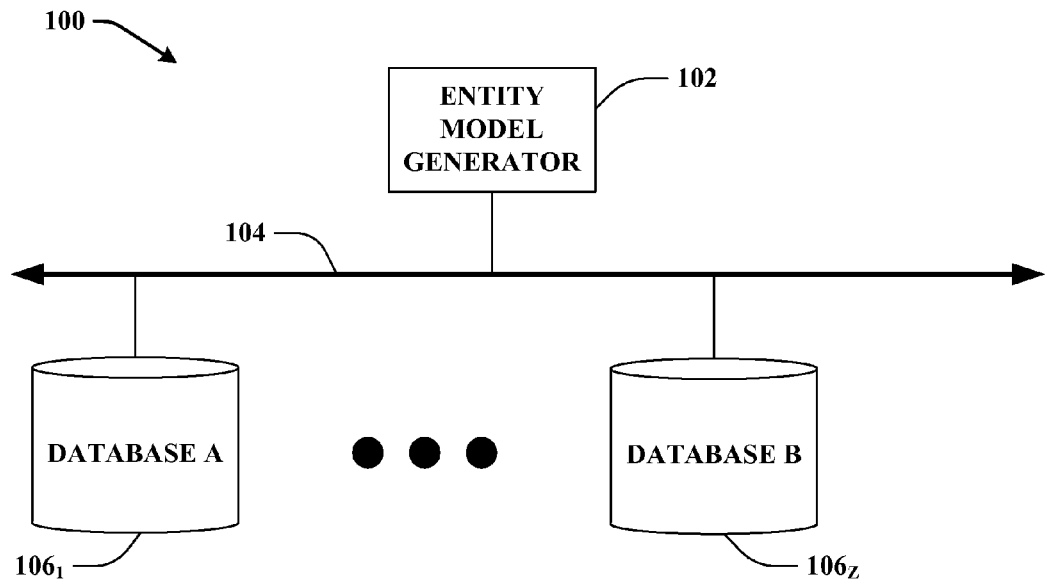
FIG. 1 illustrates a machine-implemented system that generates database entity in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Prior to embarking on an extensive discussion of the claimed subject, it should be noted for the purpose of ease of exposition rather than limitation that a "database agnostic metadata model" can refer to a model that can be employed to read metadata from a database in a vendor agnostic manner. Further, a "database instance model", as utilized herein can refer to a model created by an entity model generator and that can be utilized to interact with instance data in a database.

Currently in order to program against an object-relational mapping technology, such as an entity frame work (e.g., an object-relational mapping technology geared to solving the mismatch between the data formats as stored in databases and those that can be employed in an object-oriented programming language or other front ends), database customers (e.g., users, database administrators, database application developers, etc.) typically utilize SQL metadata embedded within application programs. Such an approach however forces database application programmers, users, administrators, and the like, to develop applications or code fragments that are database vendor (e.g., Oracle, IBM, Sybase, Microsoft, etc.) and/or database type (e.g., SQL Server, DB2, dBase, ... ) specific. In order to curtail much duplication of effort in developing applications and code segments specific to each and every database vendor and database type, utilization of entity framework models can be adopted. By switching to entity models over a database to generate target entity data models, the entity model itself can be employed to generate across multiple database vendors (e.g., Oracle, IBM, Sybase, Microsoft, ... ) and/or database types (e.g., dBase, DB2, SQL Server, etc.), and thus can be considered database vendor agnostic.

The subject matter as claimed provides systems and methods that generate conceptual models from existing databases. Construction of such conceptual models involves building database independent entity models (or database agnostic metadata models) that describe the content of a database, wherein database elements are abstracted through use of the entity framework. The constructed database agnostic metadata model, once built, can include a common abstraction for the database in terms of the entity data model (EDM), provision of vendor and/or version independent mapping and abstraction for databases that have been conceptualized through use of the claimed subject matter, and/or projection of logical models in terms of the entity data model (EDM) via native queries.

It has been found that vendors typically can need more expressive mappings than field-by-field mapping to their tables, and further that some vendors can often need to leverage native queries. The subject matter as claimed in accordance with one aspect specifies a database agnostic metadata model that can include the following concepts described in terms of entity data model (EDM) entity types and entity sets:
Tables
Views
Stored Procedures
Stored Procedure Parameters
Table Columns
View Columns
Primary Keys
Relationships
Relationship Column Maps
And the following relationships between the above concepts:
Column Primary Keys
Relationship Relationship Column Map
From Column Relationship Column Map
To Column Relationship Column Map
Table Table Columns
View View Columns
Share Procedure Stored Procedure Parameter Such entity types, entity sets, and relationships permits the claimed subject matter to reason about tables, views, stored procedures, keys, and relationships that exist in underlying databases, and/or database instances.

In order to effectuate and facilitate mapping of an actual database catalog to the foregoing structure, database vendors can specify and/or supply a combination of mappings in MSL (Mapping Schema Language) and Store-Specific queries in a Store Schema Description Language (SSDL)—typically expressed in a markup language (e.g., tag languages such as, SGML, XML, and the like). The mappings together with a previously or contemporaneously rendered or developed database agnostic metadata model (e.g., a high level conceptual entity data model of how a database structures its tables, etc.) can be employed to convert the stored structure of a database instance into a database instance model expressed as an entity data model. The resultant database instance model can include a list of objects that define and describe objects that are in a database. For instance, a list of C#, Java, or C++ entity objects that lists all tables in a database instance or target database can be produced.

FIG. 1 illustrates a system 100 that facilitates and effectuates generation of database entity models in accordance with an aspect of the claimed subject matter. System 100 can include entity model generator 102 that receives, obtains, or contemporaneously develops a database agnostic metadata model that generically describes a specific database type (e.g., SQL Server, DB2, etc.) and mapping information that can provide specific implementation details and associations in MSL and/or Store-specific queries. Typically such mapping information, like the database agnostic metadata model that can be obtained, received, or concurrently developed by entity model generator 102, can be expressed in a Conceptual Schema Definition Language (CSDL). The Conceptual Schema Description Language (CSDL) typically conforms to one or more markup language (e.g., Extensible Markup Language (XML)), though as will be appreciated by those conversant in the art, other forms of expression can be employed without departing from the scope, intent, and spirit of the claimed subject matter. It should further be noted that generally, conceptual models (e.g., database agnostic metadata models) can be written in a Conceptual Schema Description Language (CSDL), store specific information in a Store Schema Description Language (SSDL) and mapping information in a Mapping Schema Language (MSL), each of which can be expressed in one or more markup languages.

Entity model generator 102 can thereafter utilize the database agnostic metadata model together with the mapping information, specific implementation details, and/or associations against a database instance (e.g., an actual database rather than a conceptual one) to create a database instance model. Such database instance models can thereafter be employed to develop applications that can access and manipulate the database instance data through the database agnostic metadata model. The database agnostic metadata model of the database instance effectively provides a common abstraction for the database instance in terms of an entity data model (EDM) such that programming expenditure required to access, manipulate and acquire information stored in database instances can be significantly minimized.

System 100 can also include network topology 104 and database A $106_1$ ... database B $106_Z$, wherein entity generator 102 can be in continuous and operative, or sporadic but intermittent communication via network topology 104 with database A $106_1$ ... database B $106_Z$, wherein Z denotes a positive integer, whole number, or natural number greater than or equal zero (0). Network topology 104 can include any viable communication and/or broadcast technology, for example, wired and/or wireless modalities and/or technologies can be utilized to effectuate the claimed subject matter. Moreover, network topology 104 can include utilization of Personal Area Networks (PANs), Local Area Networks (LANs), Campus Area Networks (CAMs), Metropolitan Area Networks (MANs), extranets, intranets, the Internet, Wide Area Networks (WANs)—both centralized and distributed—and/or any combination, permutation, and/or aggregation thereof.

Database A $106_1$ ... database B $106_Z$ represents disparate database instances, implementations, and/or vendor types. For instance, database A $106_1$ can be a database that stores airline reservations, built using Microsoft's implementation of SQL Server, whereas database B $106_Z$ can be a database maintained by a financial institution and constructed using IBM's DB2. Each of these disparate database instances, implementations, and/or vendor types can be accessed by entity generator 102, or alternatively and/or additionally, entity generator 102 on detection of a particular database and/or database type, can automatically generate (or where a database agnostic metadata model has previously been created for a particular database type, entity generator 102 can retrieve a previously persisted version) a database agnostic metadata model of each of database A $106_1$ ... database B $106_Z$. As noted above, such a database agnostic metadata model can be written in the form of a Conceptual Schema Description Language (CSDL) that can provide a conceptual overview of specific database implementations (e.g., how particular databases are structured), and can thereafter be employed by entity generator 102 to construct database instance models that employ a particular specific database implementation.

Figure 2:
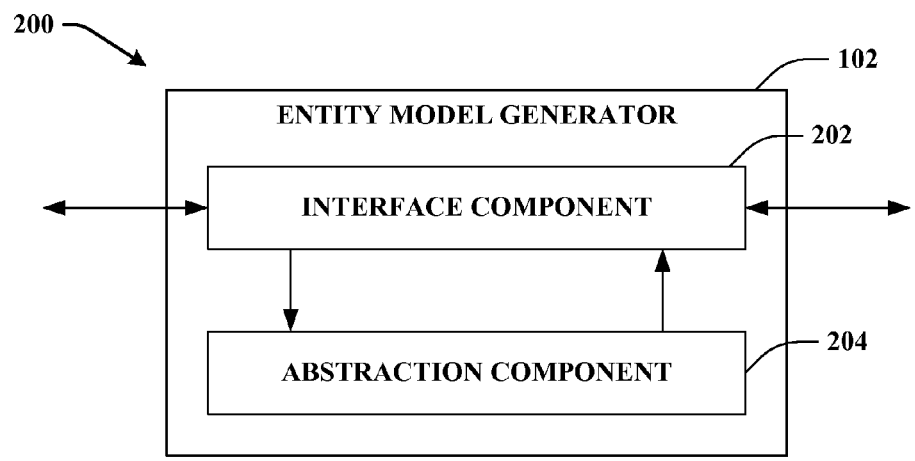
FIG. 2 depicts a machine-implemented system that effectuates and facilitates generation of database entity models in accordance with one aspect of the claimed subject matter.

FIG. 2 provides a more detailed depiction 200 of entity model generator 102 in accordance with an aspect of the claimed subject matter. Entity model generator 102 can include interface component 202 (hereinafter referred to as "interface 202") that can receive, or at the instigation of other components (not shown) included in entity model generator 102, solicit or elicit information from databases extant on, or that join network topology 104. Information that can traverse through interface 202 can include mapping information and/or previously or contemporaneously rendered or developed database agnostic metadata models. Additionally, entity model generator 102 can include abstraction component 204 that can translate a database instance, or specific database implementations into an entity-relationship diagram (e.g., a store schema description for a particular store written in a Store Schema Description Language (SSDL)) that can be represented as in a markup language, such as, XML, and that provides an conceptual abstraction of the database instance and/or the specific database implementation in terms of a list of objects that can describe the database instance (e.g., an underlying database) and/or the specific implementation (e.g., specific implementations or structural features of SQL Server).

Interface 202 can receive data from a multitude of sources, such as, for example, those associated with a particular database instance, database vendor specific details, client applications, services, users, clients, and/or entities involved with a particular transaction, a portion of transaction, and thereafter convey the received information to abstraction component 204 for further analysis and/or evaluation. Additionally, interface 202 can receive data from abstraction component 204 which then can be utilized to present high level conceptual vendor agnostic entity data models written in the form of Store Schema Description Languages that provides a conceptual overview of how particular vendors structure their databases which in turn can be utilized to build entity data models of particular database instances that employ a particular vendor specific database implementation.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data and the like associated with system 200.

Abstraction component 204 can translate a database instance, or a specific database implementation into a store schema description written in a Store Schema Description Language (SSDL), for example. The store schema description provides conceptual abstractions of database instances and/or the specific database implementation. Typically the schema description is a list of objects that describe an underlying database instance and/or specific implementation details.

The abstraction component 204 can receive, retrieve, or contemporaneously generate a high level conceptual store schema description that describes in general terms how a particular database implementation structure has been laid out. Generally, such a high level conceptual store schema description can have implementation specific commands (e.g., SELECT, JOIN, etc.) and table and/or column specifications (e.g., how a particular database structures its data), for instance. The high level conceptual store schema description, typically written in one or more Store Schema Description Language (SSDL), can also include information schema, also expressed in Store Schema Description Language (SSDL) that can contain tables, columns, stored procedures, names of stored procedures, how to call the stored procedure, etc. With the high level conceptual store schema description and mapping information, abstraction component 204 can generate a common model of a database instance. Such a common model of the database instance can be in the form of a Common Specification Description Language (CSDL) and typically is a representation of an entity-relationship diagram which has tables, views, columns, view columns, view table columns, functions, and the like.

Figure 3:
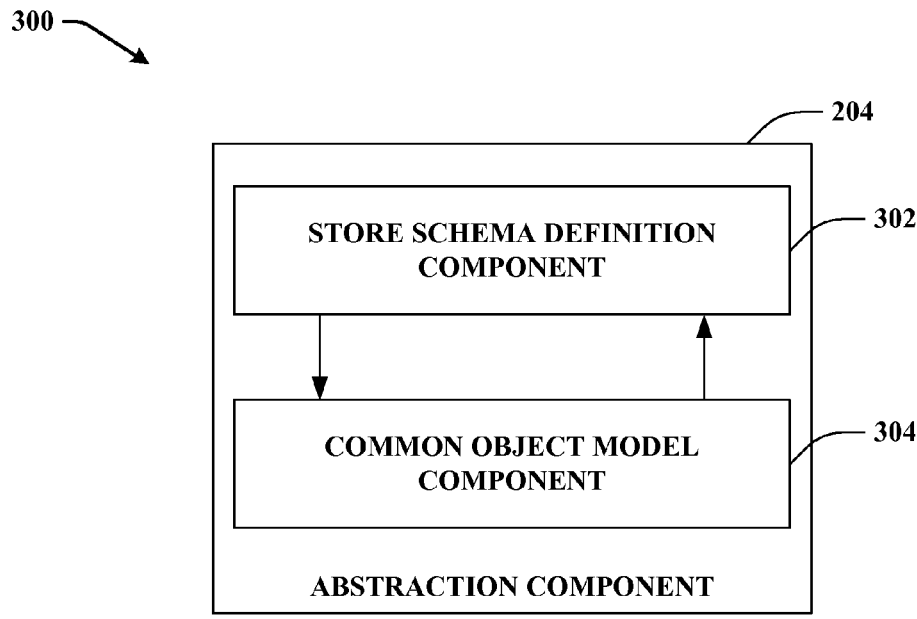
FIG. 3 provides a more detailed depiction of an illustrative abstraction component that effectuates and facilitates creating database entity data models in accordance with an aspect of the claimed subject matter.

FIG. 3 provides a more detailed illustration 300 of abstraction component 204 in accordance with an aspect of the claimed subject matter. As illustrated abstraction component 204 can include store schema definition component 302 and common object component 304. Store schema definition component 302 can receive and analyze the stored structure of a database and thereafter convert the structure into a model accessible across multiple disparate database types. In order to effectuate this conversion an high level conceptual schema description that describes in general terms how a particular database has been structured can be procured, either by generating the high level conceptual schema description contemporaneously, or by acquiring such description from local and/ or remote storage facilities when a high level conceptual schema description for a particular database implementation has previously been generated. The high level conceptual schema description can characterize how a particular database is structured in relation to database implementation. For instance, a conceptual schema description can include description of unique and/or specific SELECT and JOIN implementations. As a further example, a conceptual schema description can provide general characterization of table, table implementations, and columns included in such tables. The store schema definition component 302 can thereafter employ the high level conceptual description to provide a common model upon which model generation across multiple databases can be based.

Common model object component 304 can thereafter receive from store schema definition component 302 the constructed common model. The common model written in a common specification and description language (CSDL), for example, provides a representation of an entity-relationship diagram which can have tables, views, columns, view columns, view table columns, functions, and the like. Such a common model permits database vendors to provide a universally comprehensible representation of any database, regardless of vendor, complexity, or database type. The common model object component 304 upon receipt of the common model can generate schema descriptions (e.g., in Store Schema Description Language (SSDL)) of underlying database instances that can thereafter be employed to develop applications that can access and manipulate the database instances through the conceptual model or the common model thereby significantly reducing programming expenditure required to access, manipulate and acquire information stored in database instances.

Figure 4:
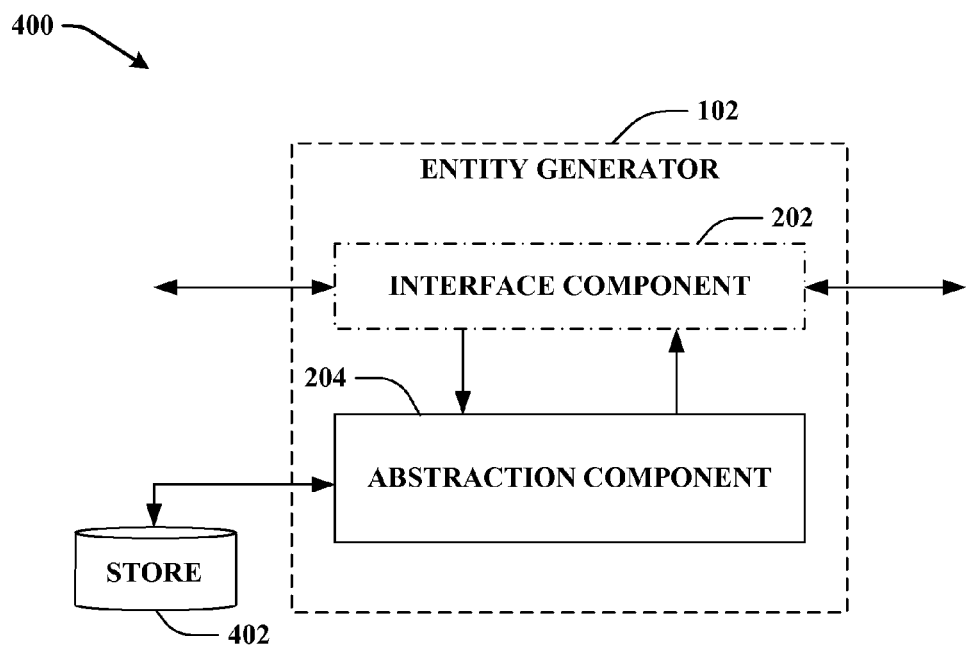
FIG. 4 illustrates a system implemented on a machine that effectuates and facilitates creating database entity data models in accordance with an aspect of the claimed subject matter.

FIG. 4 depicts an aspect of a system 400 that facilitates and effectuates generation of database entity models. System 400 can include store 402 that can include any suitable data necessary for abstraction component 402 to facilitate it its aims. For instance, store 402 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 502 of the subject systems and methods is intended to comprise, without being limited to, these and any other suitable types of memory. In addition, it is to be appreciated that store 502 can be a server, a database, a hard drive, and the like.

Figure 5:
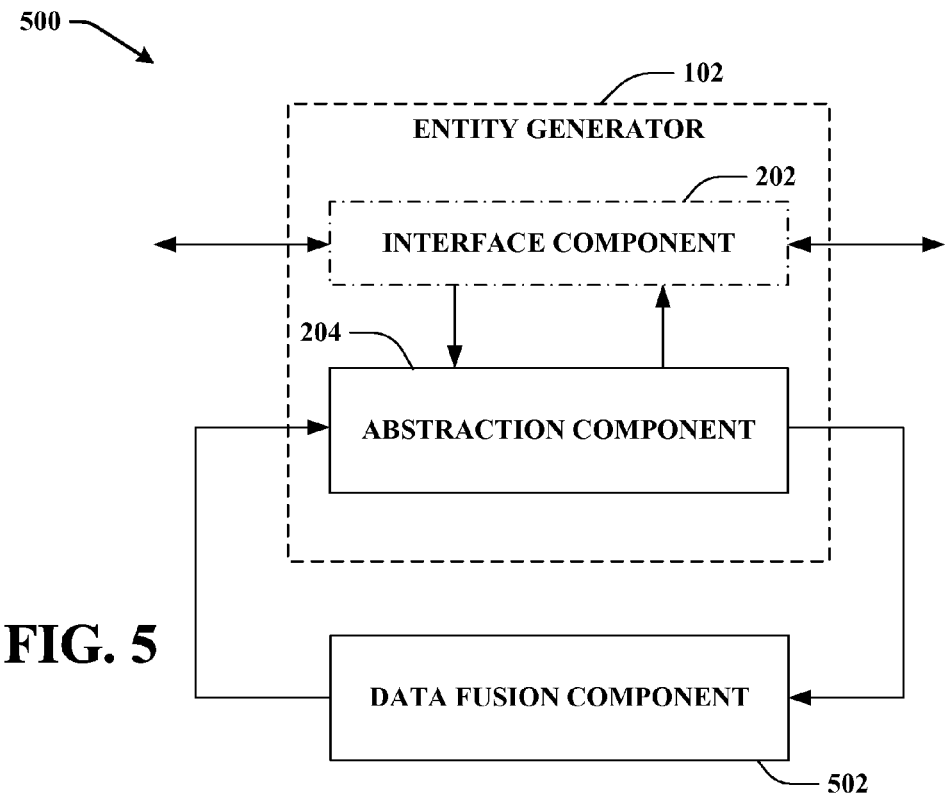
FIG. 5 provides a further depiction of a machine implemented system that effectuates and facilitates generation of database entity data models in accordance with an aspect of the subject matter as claimed.

FIG. 5 provides yet a further depiction of a system 500 that facilitates and effectuates creation or generation of database entity models in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
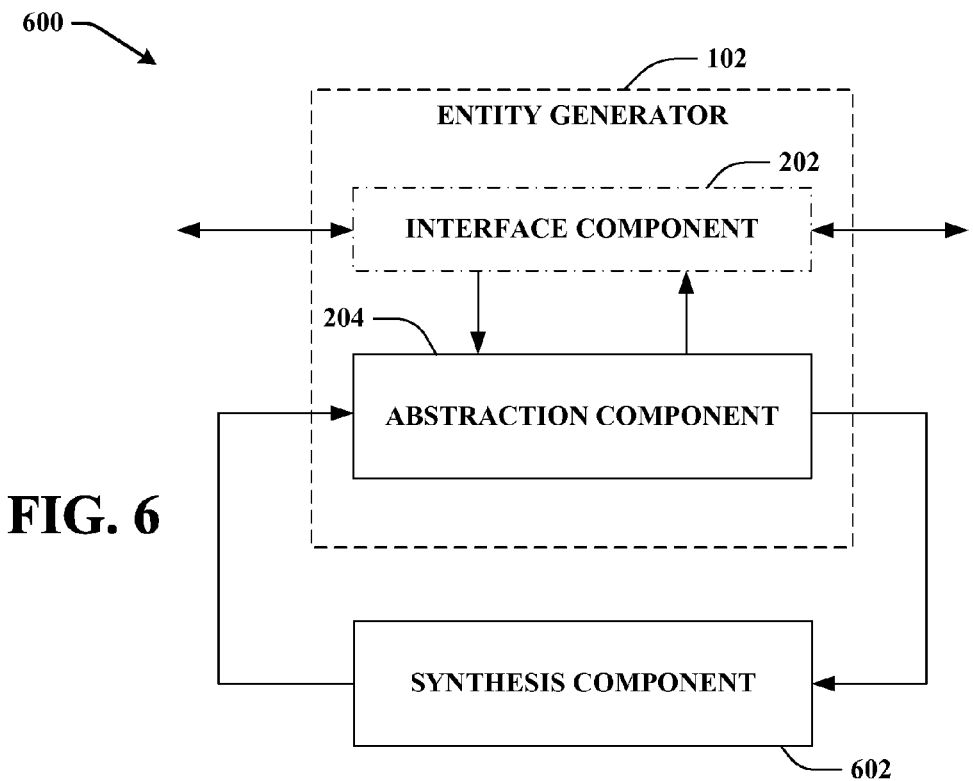
FIG. 6 illustrates yet another aspect of the machine implemented system that effectuates and facilitates creating database entity data models in accordance with an aspect of the claimed subject matter.

FIG. 6 provides a further depiction of a system 600 that facilitates and effectuates creation or generation of database entity models in accordance with an aspect of the claimed subject matter. As illustrated abstraction component 204 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, or accurate (e.g., with respect to an entity's communicative or informational goals) and information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
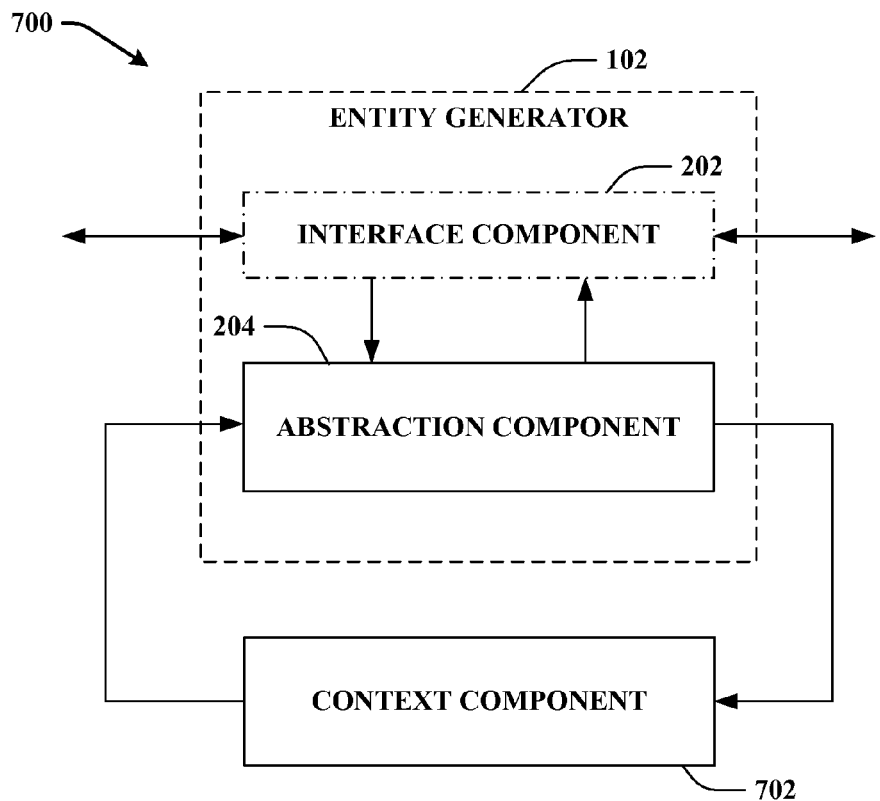
FIG. 7 depicts a further illustrative aspect of the machine implemented system that effectuates and facilitates creating database entity data models in accordance with an aspect of the claimed subject matter.

FIG. 7 provides a further illustration of a system 700 that can facilitates and effectuate creation or generation of database entity models in accordance with an aspect of the claimed subject matter. As illustrated abstraction component 204 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
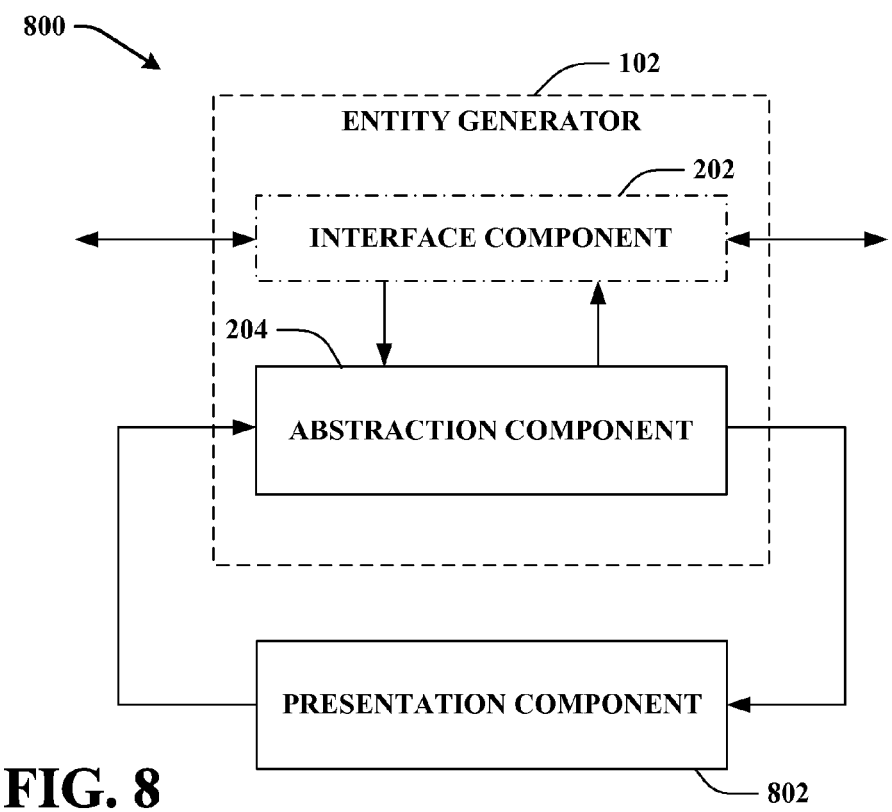
FIG. 8 illustrates another illustrative aspect of a system implemented on a machine that effectuates and facilitates creating database entity data models in accordance of yet another aspect of the claimed subject matter.

FIG. 8 is a further illustration of a system 800 that facilitates and effectuates creation or generation of database entity models in accordance with an aspect of the claimed subject matter. As illustrated, system 800 can include presentation component 802 that can provide various types of user interface to facilitate interaction between a user and any component coupled to abstraction component 204. As illustrated, presentation component 802 is a separate entity that can be utilized with abstraction component 204. However, it is to be appreciated that presentation component 802 and/or other similar view components can be incorporated into abstraction component 204 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into abstraction component 204.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
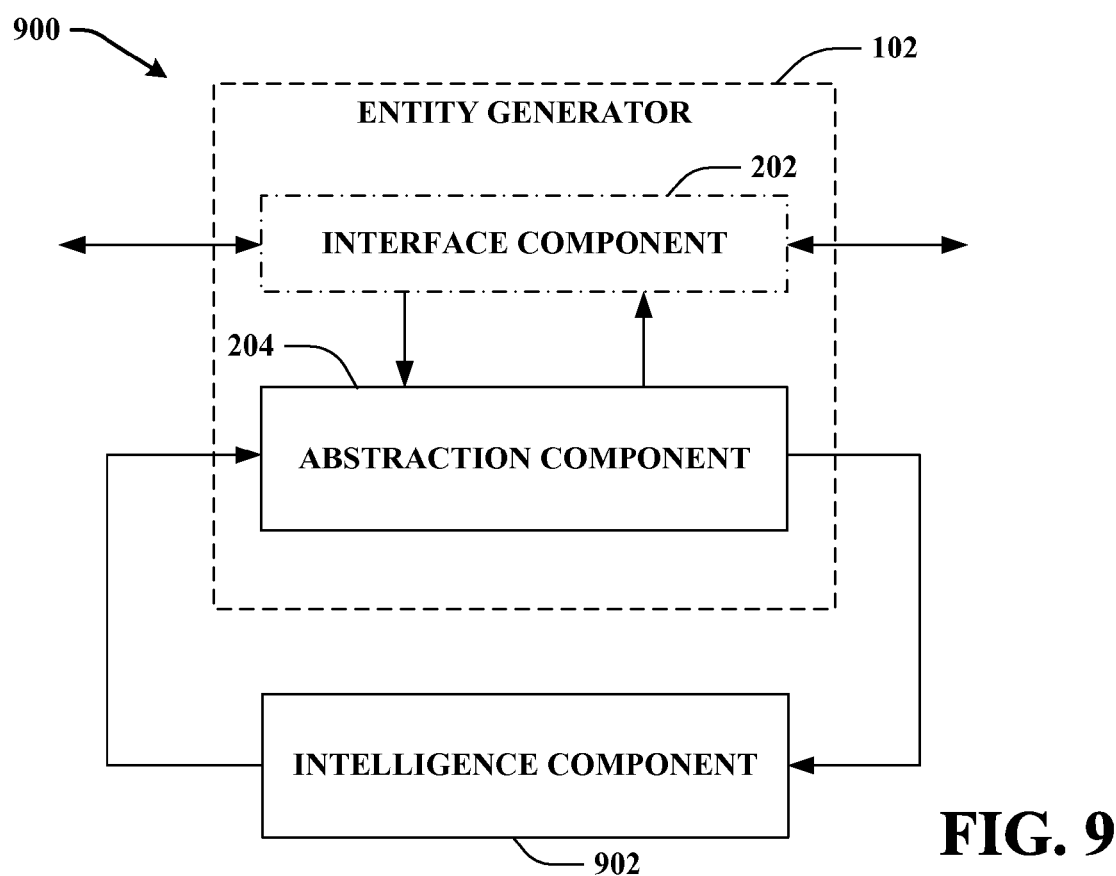
FIG. 9 depicts yet another illustrative aspect of a system that effectuates and facilitates creating database entity data models in accordance with an aspect of the subject matter as claimed.

FIG. 9 depicts a system 900 that employs artificial intelligence to facilitate and effectuate creation or generation of database entity models in accordance with an aspect of the subject matter as claimed. Accordingly, as illustrated, system 900 can include an intelligence component 902 that can employ a probabilistic based or statistical based approach, for example, in connection with making determinations or inferences. Inferences can be based in part upon explicit training of classifiers (not shown) before employing system 200, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
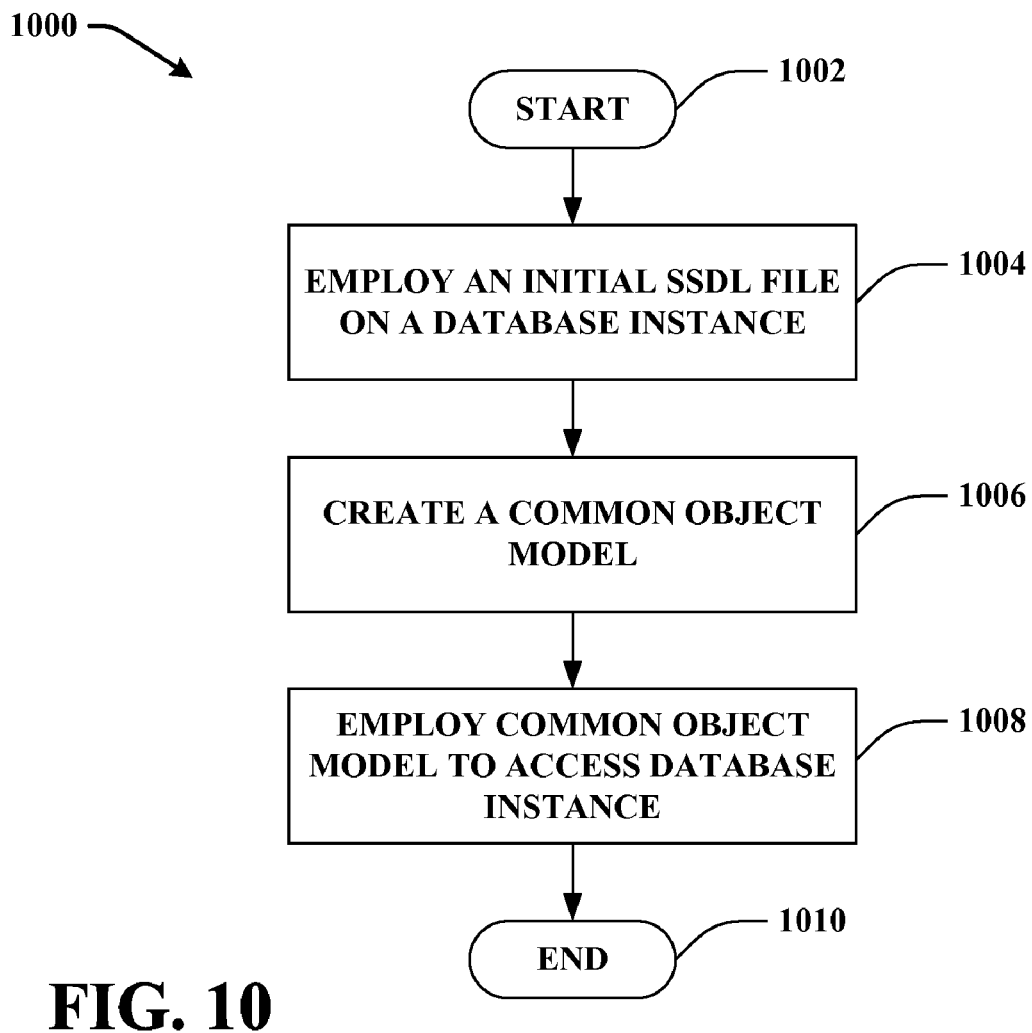
FIG. 10 illustrates a flow diagram of a machine implemented methodology that effectuates and facilitates creating database entity data models in accordance with an aspect of the claimed subject matter.

In view of the exemplary systems shown and described supra, methodologies that may be implemented in accordance with the disclosed subject matter will be better appreciated with reference to the flow chart of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 10 illustrated an illustrative methodology 1000 that effectuate creation or generation of database entity models in accordance with an aspect of the subject matter as claimed. The method commences at 1002 where various and sundry initializations can take place after which the method can proceed to 1004. At 1004 method 1000 can receive, acquire, or contemporaneously develop an initial agnostic conceptual entity data model (e.g., database agnostic metadata model) that provides a high level description of a specific database. The initial agnostic conceptual model expressed in a markup language can thereafter be employed against a database instance. At 1006 the initial agnostic conceptual model entity data model together with mapping information that can provide specific implementation details, relationships, and/or associations can be applied against a database instance to create or generate a common object model (e.g., database instance model) that can be written, for example, in a common specification and description language (CSDL). The common object model so created can thereafter be employed to develop applications that can be utilized to access, manipulate and/or modify databases represented in terms of the common object model. At 1008 the method terminates wherein garbage collection can be performed and variables employed and/or initialized for use by method 1000 can be reset.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
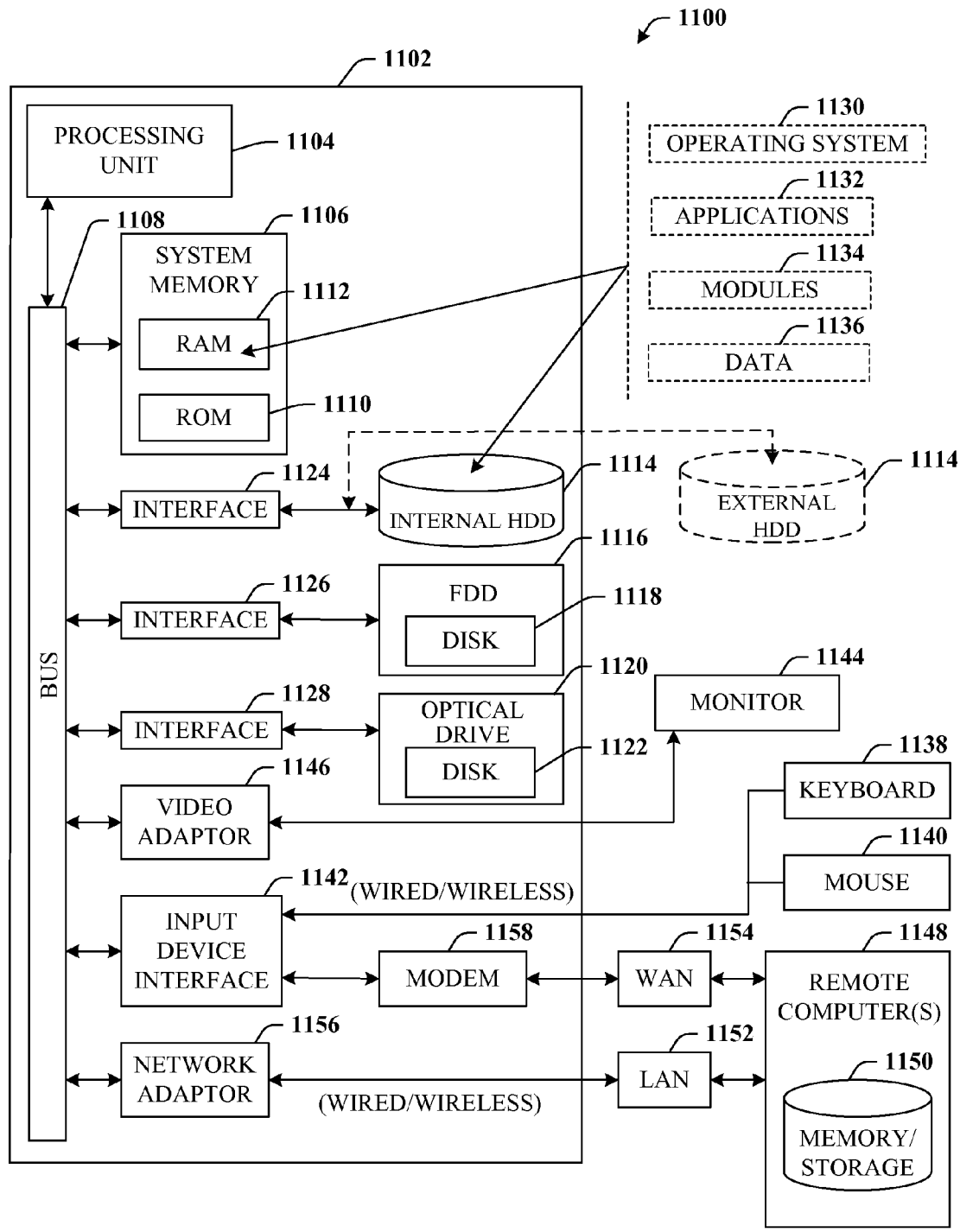
FIG. 11 illustrates a block diagram of a computer operable to execute the disclosed system in accordance with an aspect of the claimed subject matter.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 12:
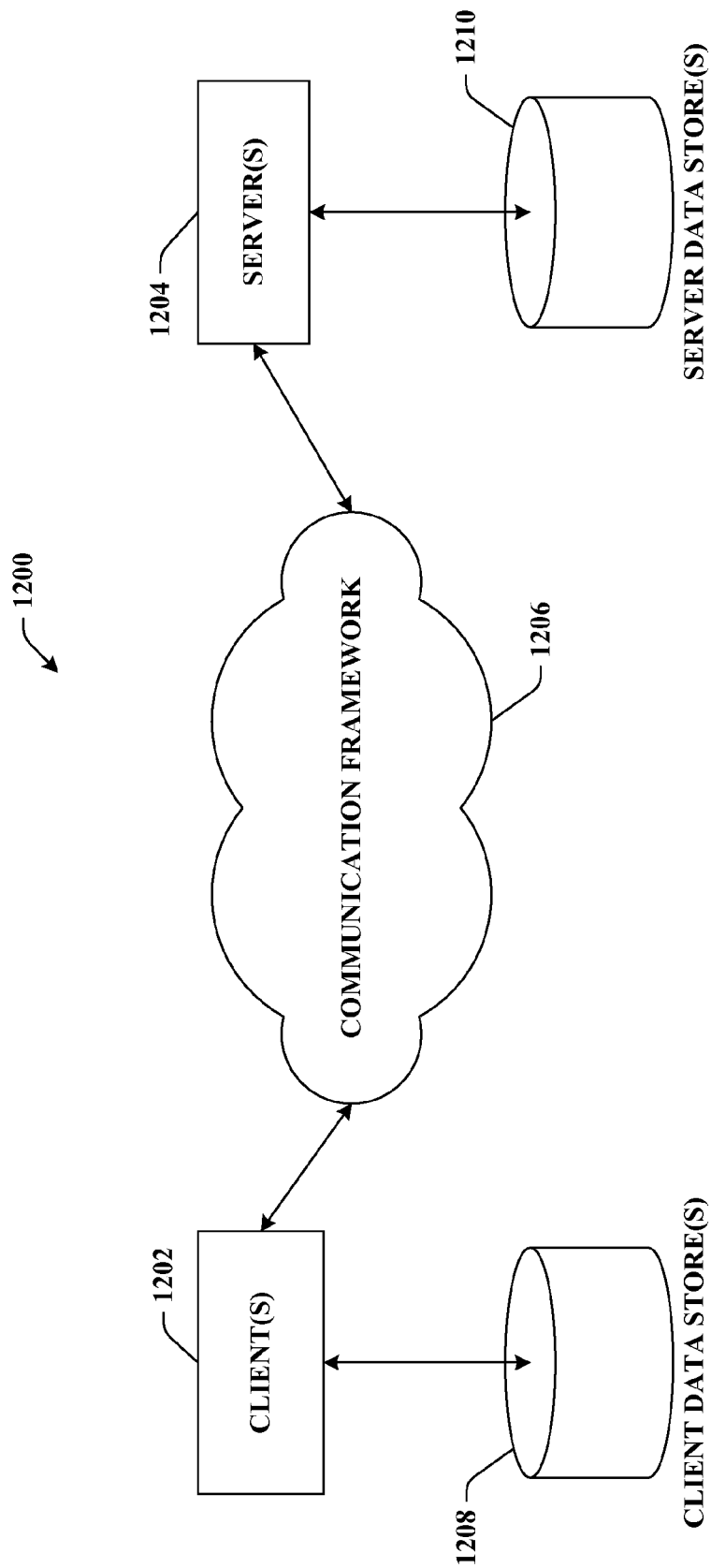
FIG. 12 illustrates a schematic block diagram of an exemplary computing environment for processing the disclosed architecture in accordance with another aspect.

Referring now to FIG. 12, there is illustrated a schematic block diagram of an exemplary computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising at least one processor coupled to at least one computer-readable storage medium storing instructions, the instructions executable by the at least one processor to implement:
   an interface component configured to receive database mapping information and a database agnostic metadata model providing a conceptual-level description of a specific database, the database mapping information and the database agnostic metadata model expressed in a mark-up language;
   an abstraction component configured to, based on the mapping information and database agnostic metadata model, generate a common object model comprehensible across multiple database types; and
   a common object model component configured to, based on the common object model, generate a schema description of a database instance in a Store Schema Description Language (SSDL);
   wherein the interface component is further configured to be in either of continuous or intermittent communication with a network topology including a plurality of disparate database instances, implementations, and vendor types, and to receive or, at the instigation of other components, solicit or elicit information from the network topology, the information including the mapping information and previously and contemporaneously rendered or developed database agnostic metadata models.

2. The system of claim 1, wherein the mark-up language expresses a store schema description in a store schema description language (SSDL).

3. The system of claim 1, further comprising a data fusion component configured to analyze inputs received through a plurality of different sensing modalities, at least in part by employing algorithmic processing of sensor data to compensate for inherent fragmentation of information in phenomena not directly observable using a single sensing modality.

4. The system of claim 2, wherein the store schema description is vendor agnostic.

5. The system of claim 1, wherein the common object model is vendor agnostic.

6. The system of claim 2, wherein the store schema description is configured to provide an entity-relationship diagram of vendor specific implementations of a database instance, and wherein the entity-relationship diagram is configured to provide a conceptual abstraction of the database instance and at least one specific database implementation in terms of a list of objects describing the database instance and the specific implementation.

7. The system of claim 1, wherein the common object model is configured to describe information schema data within a database instance.

8. The system of claim 7, wherein the information schema includes descriptions of tables, columns, stored procedures, names of the stored procedures, or methods to call the stored procedures.

9. The system of claim 1, wherein the common object model is characterized utilizing a common specification and description language (CSDL).

10. The system of claim 1, wherein the common object model is configured to provide representation of an entity-relationship diagram.

11. The system of claim 10, wherein the entity relationship diagram includes tables, views, columns, view columns, view table columns, or functions.

12. The system of claim 2, wherein the store schema description is configured to be utilized on a database instance to divulge a structure of the database instance.

13. The system of claim 1, wherein the conceptual-level description of the database agnostic metadata describes, in terms of entity data model entity types and entity sets, at least one of tables, views, stored procedures, keys or relationships, for reasoning about at least one of tables, views, stored procedures, keys or relationships that exist in database instances.

14. The system of claim 1, wherein the common object model includes a plurality of objects, each object defining a database object included in a database instance.

15. A machine-implemented method, comprising:
   communicating either continuously or intermittently with a network topology that includes multiple databases of disparate vendor types;
   soliciting, from the network topology, database mapping information and a plurality of contemporaneously developed database agnostic metadata models;
   based on the soliciting, receiving the database mapping information and a database agnostic metadata model, the database mapping information and the database agnostic metadata model expressed in a mark-up language;
   utilizing the database mapping information and the database agnostic metadata model to generate a common object model comprehensible across multiple database types;
   generating, based on the common object model, a schema description of a database instance in a Store Schema Description Language (SSDL); and
   employing the schema description to access, modify, or manipulate a table entry in the database instance.

16. The method of claim 15, the utilizing further including employing a vendor specific store schema description to cause the database instance to divulge an internal structure of the database instance.

17. The method of claim 16, further comprising including all tables associated with the database instance in an internal structure of the database instance.

18. The method of claim 15, further comprising rendering the database agnostic metadata model substantially contemporaneously with receiving the database mapping information.

19. The method of claim 15, further comprising rendering the common object model comprehensible across multiple vendor or database types.

20. A computer-readable storage medium storing instructions, the instructions to, if executed by a computing device, cause the computing device to perform operations comprising:

based on at least one of continuous or intermittent communication with a network topology that includes multiple databases of disparate vendor types, soliciting database mapping information and a plurality of contemporaneously developed database agnostic metadata models from the network topology;

based on the soliciting, acquiring the database mapping information and a database agnostic metadata model, the database mapping information and the database agnostic metadata model expressed in a mark-up language;

generating a common object model comprehensible across multiple database types based on the database mapping information and the database agnostic metadata model;

based on the common object model, generating a schema description of a database instance; and manipulating, accessing, or modifying the database instance based at least in part on the schema description.

* * * * *

UNITED STATES PATENT AND TRADEMARK OFFICE
CERTIFICATE OF CORRECTION

| | | |
|---|---|---|
| PATENT NO. | : 8,150,886 B2 | Page 1 of 1 |
| APPLICATION NO. | : 11/846716 | |
| DATED | : April 3, 2012 | |
| INVENTOR(S) | : James Bradley Rhodes et al. | |

It is certified that error appears in the above-identified patent and that said Letters Patent is hereby corrected as shown below:

In column 7, line 49, delete "it its" and insert -- its --, therefor.

Signed and Sealed this
Ninth Day of October, 2012

David J. Kappos
*Director of the United States Patent and Trademark Office*